(12) United States Patent
Spattini

(10) Patent No.: US 12,149,574 B2
(45) Date of Patent: Nov. 19, 2024

(54) DATA COLLABORATION APPLICATION IN A NETWORKED ENVIRONMENT

(71) Applicant: Biamp Systems, LLC, Beaverton, OR (US)

(72) Inventor: Stefano Spattini, Campogalliano (IT)

(73) Assignee: Biamp Systems, LLC, Beaverton, OR (US)

( * ) Notice: Subject to any disclaimer, the term of this patent is extended or adjusted under 35 U.S.C. 154(b) by 0 days.

(21) Appl. No.: 17/952,207

(22) Filed: Sep. 24, 2022

(65) Prior Publication Data

US 2023/0131557 A1    Apr. 27, 2023

Related U.S. Application Data

(60) Provisional application No. 63/271,331, filed on Oct. 25, 2021.

(51) Int. Cl.
*H04L 65/403* (2022.01)
*G06F 16/14* (2019.01)
*G06F 16/176* (2019.01)
*H04L 65/1089* (2022.01)

(52) U.S. Cl.
CPC .......... *H04L 65/403* (2013.01); *G06F 16/148* (2019.01); *G06F 16/176* (2019.01); *H04L 65/1089* (2013.01)

(58) Field of Classification Search
CPC ... H04L 65/403; H04L 65/1089; H04L 12/18; H04L 63/10; H04L 67/00; H04L 67/06; H04L 67/10; H04L 67/42; H04L 67/1095; H04M 3/56; H04N 7/15; G06F 16/14; G06F 16/93; G06F 16/148; G06F 16/176; G06F 16/907; G06F 17/30; G06F 17/265; G06F 17/3089; G06F 17/30011; G06F 17/30067; G06F 17/30165; G06F 17/301711; G06F 21/62; G06F 21/6218; G06F 3/048; G06F 3/0482
USPC .......................................................... 709/204
See application file for complete search history.

(56) References Cited

U.S. PATENT DOCUMENTS

| | | | | |
|---|---|---|---|---|
| 7,702,730 B2* | 4/2010 | Spataro | .................... | G06F 16/93 709/205 |
| 8,108,779 B1* | 1/2012 | Rein | ....................... | G06F 16/40 715/733 |
| 8,214,747 B1* | 7/2012 | Yankovich | ............ | G06F 9/4451 715/810 |
| 9,420,017 B2* | 8/2016 | Edson | ..................... | G06F 16/93 |
| 10,678,867 B2* | 6/2020 | Chander | ............... | G06F 40/169 |
| 11,714,526 B2* | 8/2023 | LaFave | ................. | H04L 65/403 715/753 |
| 2005/0165859 A1* | 7/2005 | Geyer | .................... | G06Q 10/10 |

(Continued)

OTHER PUBLICATIONS

International Search Report and Written Opinion issued in the International Application No. PCT/US2022/047775, mailed on Feb. 28, 2023.

*Primary Examiner* — James N Fiorillo

(57) ABSTRACT

One example operation may include receiving, via a collaboration server, objects from respective client devices, providing the objects to a common virtual workspace, receiving one or more modifications to the objects from one or more of the client devices, forwarding the one or more modifications to each of the plurality of client devices, and updating a master version of the common virtual workspace to include the one or more modifications.

20 Claims, 7 Drawing Sheets

(56) References Cited

U.S. PATENT DOCUMENTS

| | | | |
|---|---|---|---|
| 2006/0053380 A1* | 3/2006 | Spataro | G06F 16/93 709/204 |
| 2006/0129935 A1* | 6/2006 | Deinlein | G06Q 10/10 707/E17.107 |
| 2012/0198559 A1* | 8/2012 | Venkata Naga Ravi | G06F 21/62 726/26 |
| 2013/0124612 A1* | 5/2013 | Braginsky | H04L 67/01 709/203 |
| 2013/0254699 A1* | 9/2013 | Bashir | G06F 3/0481 715/772 |
| 2013/0275429 A1* | 10/2013 | York | G06F 16/435 707/E17.002 |
| 2014/0156681 A1* | 6/2014 | Lee | G06F 16/9535 707/754 |
| 2014/0222758 A1* | 8/2014 | March | G06F 16/1873 707/638 |
| 2014/0298207 A1* | 10/2014 | Ittah | G06Q 10/00 715/753 |
| 2015/0006237 A1* | 1/2015 | Beck | G06Q 10/0633 705/7.27 |
| 2015/0149404 A1* | 5/2015 | Lock | G06F 16/93 707/608 |
| 2015/0200945 A1* | 7/2015 | Edson | G06F 16/93 726/28 |
| 2016/0117495 A1* | 4/2016 | Li | H04L 63/105 726/1 |
| 2018/0189311 A1* | 7/2018 | Newhouse | G06F 21/52 |
| 2019/0057088 A1* | 2/2019 | Chander | G06F 16/907 |
| 2019/0089768 A1* | 3/2019 | Houston | H04L 67/1095 |
| 2019/0114036 A1* | 4/2019 | Jones | H04N 7/15 |
| 2020/0374347 A1* | 11/2020 | Rashid | H04L 67/1095 |
| 2021/0342337 A1* | 11/2021 | Lu | G06F 11/324 |
| 2022/0012268 A1* | 1/2022 | Ghoshal | G06F 16/285 |
| 2022/0086109 A1* | 3/2022 | Ramirez | H04L 51/56 |
| 2022/0092026 A1* | 3/2022 | Rice | H04L 67/306 |
| 2022/0207163 A1* | 6/2022 | Gentleman | G06F 21/62 |
| 2022/0207429 A1* | 6/2022 | Haribhakti | G06F 18/214 |
| 2022/0236942 A1* | 7/2022 | Wu | G06F 3/1454 |
| 2022/0277091 A1* | 9/2022 | Moharana | G06F 21/6245 |
| 2023/0266869 A1* | 8/2023 | Shimizu | G06F 40/221 715/760 |

* cited by examiner

DATA COLLABORATION APPLICATION IN A NETWORKED ENVIRONMENT

BACKGROUND

In a workplace, conference area, public forum or other environment (e.g., across the Internet), data collaboration via a conference platform or similar data sharing platform may enable different user devices to communicate and share audio, video, images, virtual whiteboard information, etc. Conferencing becomes increasingly popular each year as the number of people spread out over different locations, that need to communicate and share information, continues to rise. The conventional approach of receiving a conference call calendar reminder or scheduled date and logging in at a particular time is becoming increasingly stressful for participants as the number of conferences attended continues to grow each week for various members of a corporate team or other working environment. The sharing of information in a conference environment should not require: a specific log-on' time, a specific set of information (e.g., data files, etc.) being located and prepared to be shared at the last moment prior to the meeting commencement, and a quiet and professional space to rest a computing device necessary to connect with the live conference.

SUMMARY

One example embodiment may provide a method that includes one or more of various operations including receiving, via a collaboration server, a plurality of objects from a respective plurality of client devices, providing the plurality of objects to a common virtual workspace, receiving one or more modifications to one or more of the plurality of objects from one or more of the client devices, forwarding the one or more modifications to each of the plurality of client devices, and updating a master version of the common virtual workspace to include the one or more modifications.

Another example embodiment may include an apparatus that includes a receiver configured to receive a plurality of objects from a respective plurality of client devices, and a processor configured to provide the plurality of objects to a common virtual workspace, receive one or more modifications to one or more of the plurality of objects from one or more of the client devices, forward the one or more modifications to each of the plurality of client devices, and update a master version of the common virtual workspace to include the one or more modifications.

Yet another example embodiment may include a non-transitory computer readable storage medium configured to store instructions that when executed cause a processor to perform receiving, via a collaboration server, a plurality of objects from a respective plurality of client devices, providing the plurality of objects to a common virtual workspace, receiving one or more modifications to one or more of the plurality of objects from one or more of the client devices, forwarding the one or more modifications to each of the plurality of client devices, and updating a master version of the common virtual workspace to include the one or more modifications.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Figure 1:
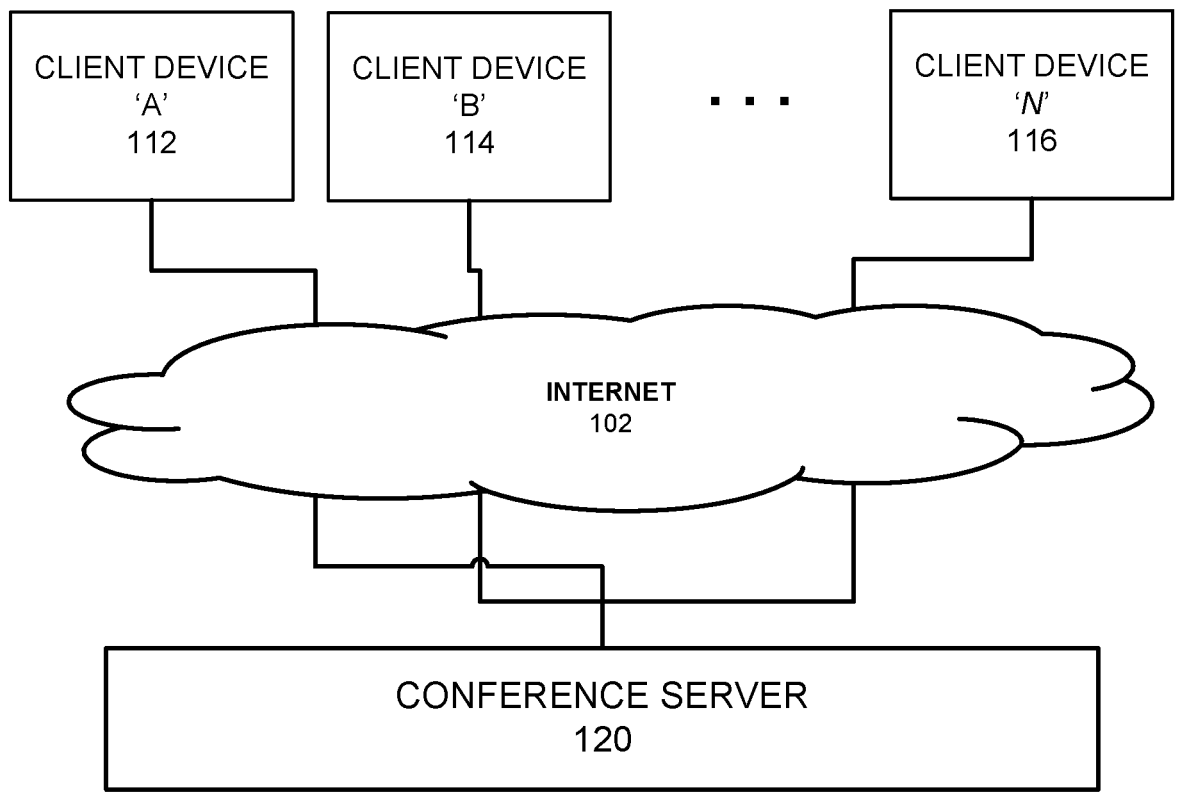
FIG. 1 illustrates a data collaboration environment including various client devices collaborating across different Internet connections according to example embodiments.

FIG. 1 illustrates a data collaboration environment including various client devices collaborating across different Internet connections according to example embodiments. Referring to FIG. 1, the configuration 100 includes various client devices 112, 114 . . . 116 (e.g., laptops, mobile phones, smart watches, smart glasses, transport vehicles, smartphones, tablets, desktop computers, etc.) which are connecting to a conference or collaboration application via a conference server 120. The connections are made across the Internet 102, which enables the devices to be located in different locations from one another.

Figure 2:
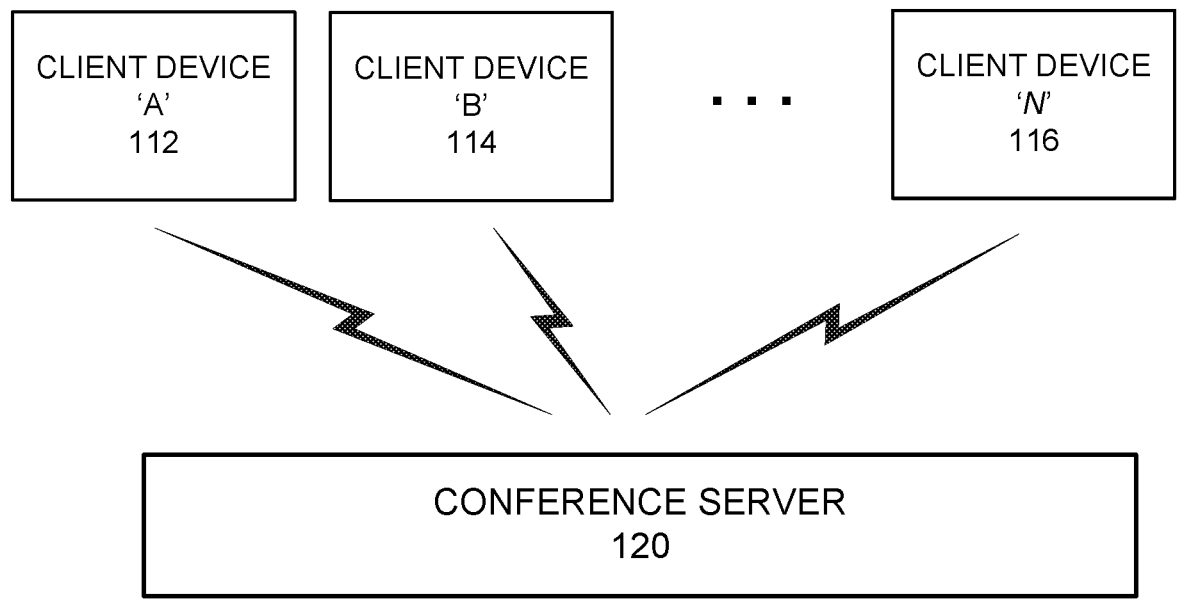
FIG. 2 illustrates a data collaboration environment including various client devices collaborating directly with a central data collaboration device according to example embodiments.

FIG. 2 illustrates a data collaboration environment including various client devices collaborating directly with a central data collaboration device according to example embodiments. Referring to FIG. 2, in another example, the client devices 112-116 connect to the conference server 120 directly via direct connections, such as wireless communication signals which are directed at the conference server 120 which provides the application for data collaboration, conferencing, etc.

Figure 3:
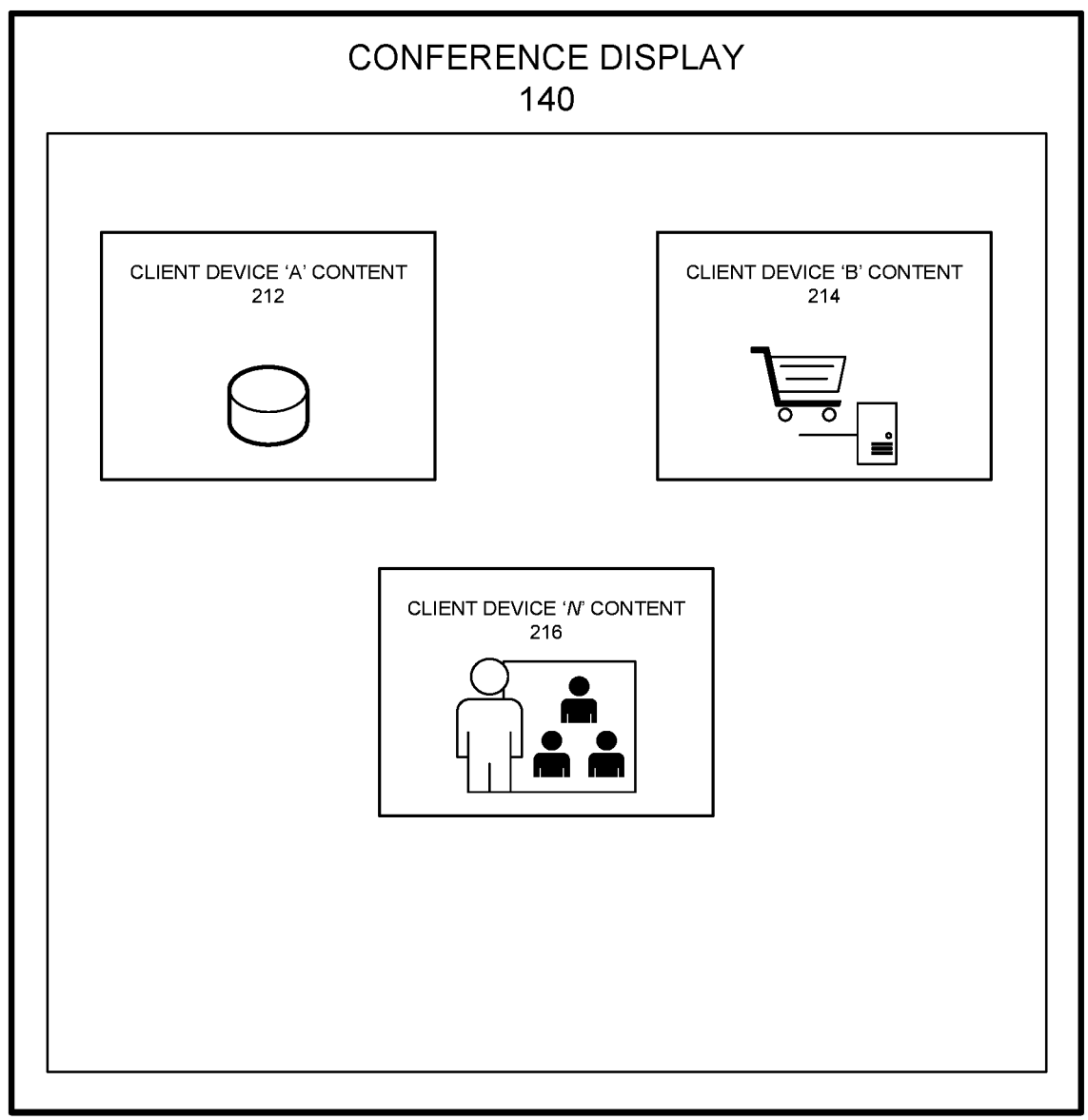
FIG. 3 illustrates an example graphical user interface of a data collaboration display including content from various different client devices according to example embodiments.

FIG. 3 illustrates an example graphical user interface of a data collaboration display including content from various different client devices according to example embodiments. Referring to FIG. 3, the example includes content, such as objects (e.g., links to file folder, links to databanks, icons, images, audio/video files, etc.). The objects may have been shared intentionally by each device, such as a via a drag and drop operation, and/or a monitoring function that tracks activity on a client device to detect device actions and other activity to infer which objects to include in the collaboration display 140 of multiple different devices, which may include content 212, 214 and 216 from client devices 'A'-'N', or via an automated selection and sharing process which may include automated selection and sharing operations. For example, a collaboration session that is active on a particular device may provide access to certain objects on the client device display, a predetermined folder(s) where data files, links and related data objects are stored, etc. The collaboration session may share content from multiple client devices on a single display 140. Each device may be assigned its own portion of the user interface display shared with all collaborating devices. Any device may have the rights to access and modify the objects shared by other client devices, or instead, each device may only have permissions to access but not modify the objects of others. Permissions may be necessary to change the objects or to modify (e.g., draw over, change, etc.) objects. In the automated updating example, the collaboration session may have predetermined rights to access predetermined folders and share the content of the folder with the master display 140. For example, a user may have a folder for an ongoing collaboration session for a specific project 'ABC' or 'XYZ'. The user may use their device to place files, directories, presentations, etc., in that specific shared folder. The collaboration session may be an ongoing process that does not end and may include a procedure for monitoring the shared folders on various client devices and identifying new objects which were not previously identified and share the updated object information with all parties. The process may include identifying the newly identified objects, copying the new object(s) and placing the new object(s) in a portion of the virtual collaboration space designated for that particular client device. This automated process may permit the users to place information in their own desktop folders and have that information updated with all client devices via the collaboration interface.

Figure 4:
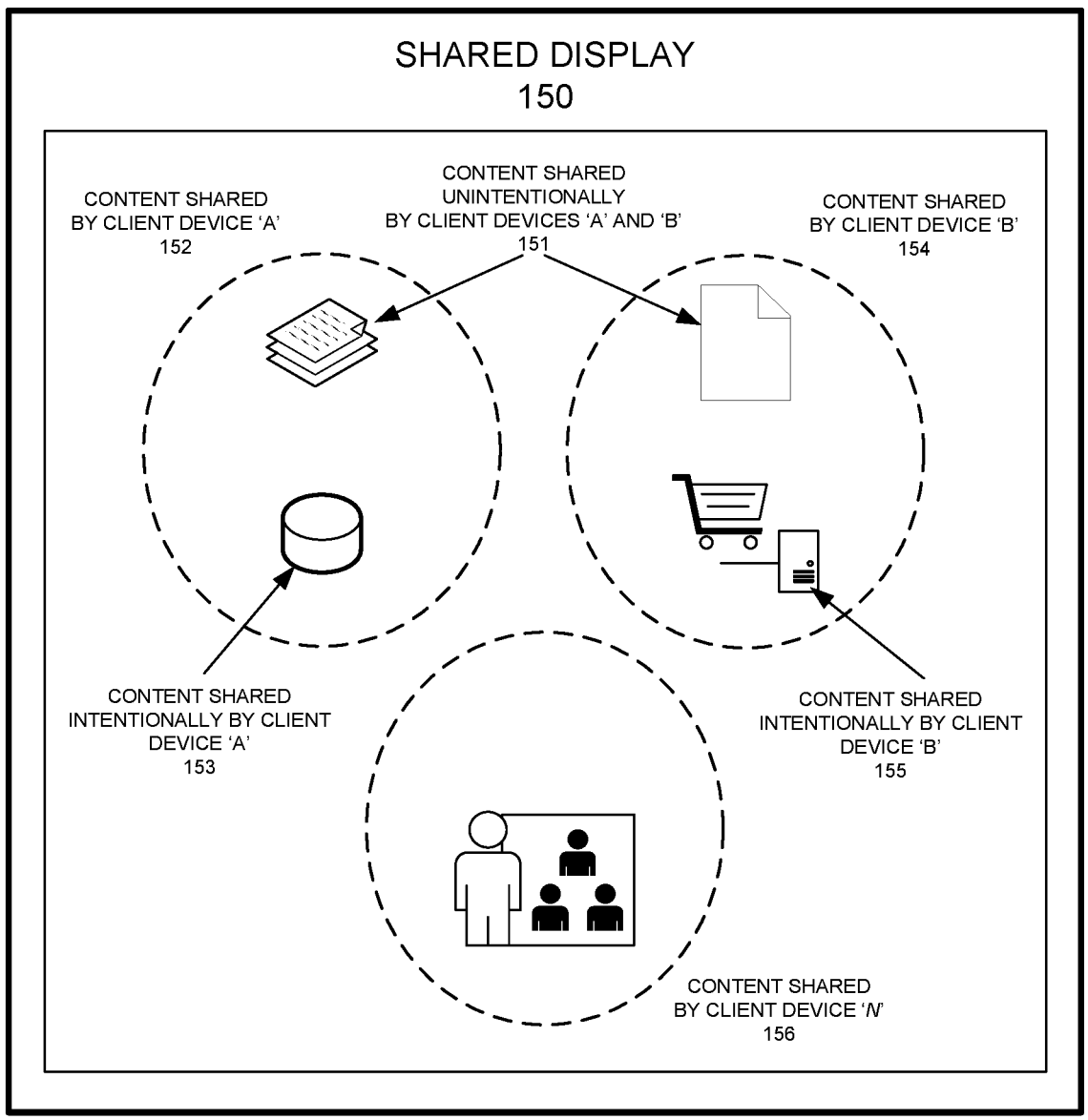
FIG. 4 illustrates an example graphical user interface of a data collaboration display including intentional and unintentional content received from various different client devices according to example embodiments.

FIG. 4 illustrates an example graphical user interface of a data collaboration display including intentional and unintentional content received from various different client devices according to example embodiments. Referring to FIG. 4, the shared display 150 may include content 152, 154 and 156 that is shared by each of the client devices. This shared content may be separated into content that is shared intentionally 153 and 155 by the client devices, such as a link to a databank 153, an icon of a shopping cart 155, etc. Also, certain shared content may be unintentionally shared by the collaboration application by locating the content in a designated folder of the client device(s), and copying the content and placing the content in a predetermined location of the shared display that is assigned to the client device where the content was identified. In this example, the unintentional shared content 151 may include a file link for client device 'A' and the document for client device 'B', which may have been identified from an automated content engine that located the objects and placed them on the display interface by a routine search operation that led to the discovery of such content. As time progresses, the amount of objects may increase or decrease depending on what is discovered in a particular client device folder and the objects found may be shared in a collaborated virtual share space that includes content from more than one client device.

Figure 5:
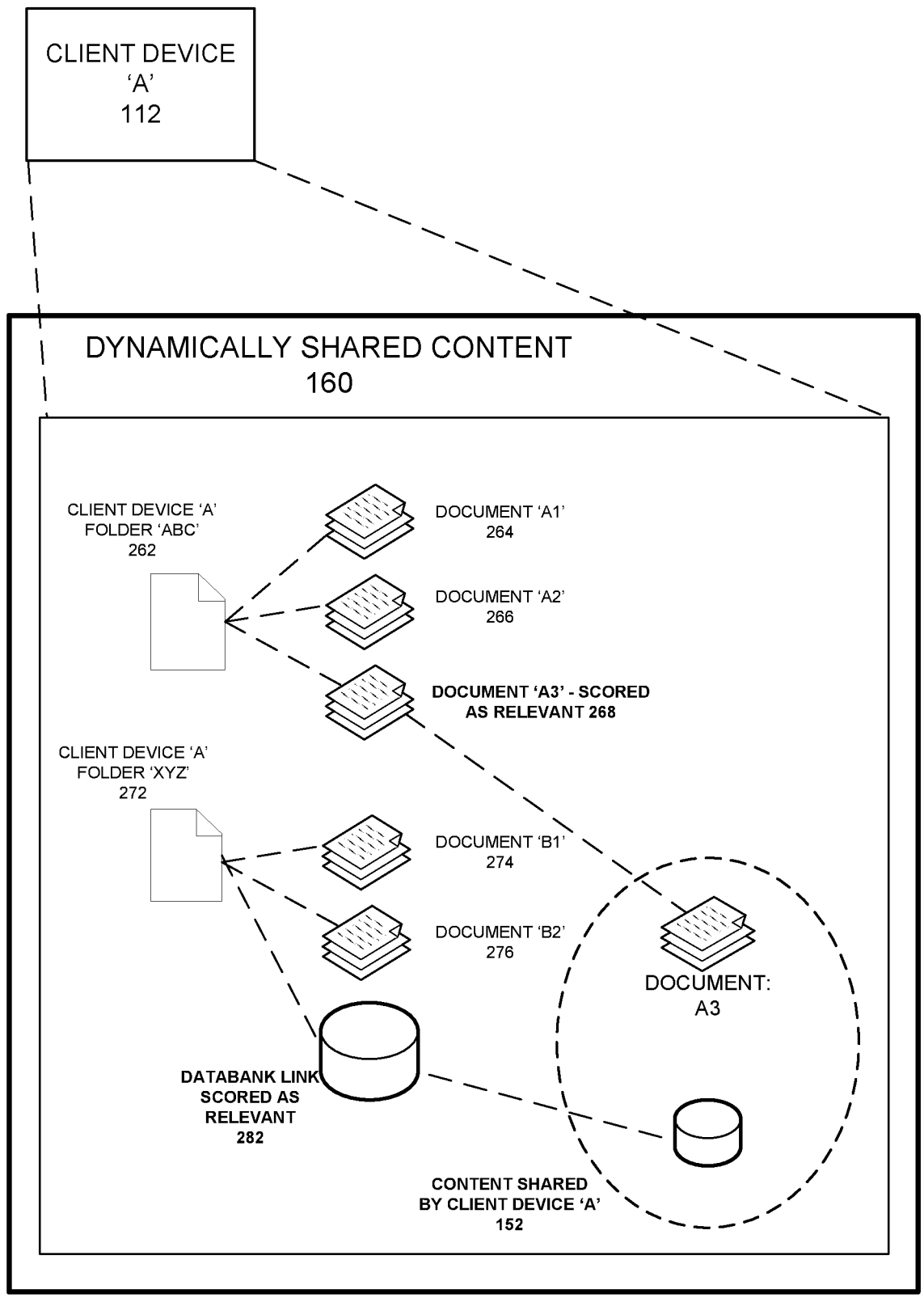
FIG. 5 illustrates an example graphical user interface of a data analysis example where intentional and unintentional content are identified from a specific client device according to example embodiments.

FIG. 5 illustrates an example graphical user interface of a data analysis example where intentional and unintentional content are identified from a specific client device according to example embodiments. Referring to FIG. 5, the content of a particular client device 'A' 112 may include portions which are dynamically shared 160. The content of client device 'A' 112 may also include portions which are not shared. In one example, a client device folder 'ABC' 262 may include various documents 264, 266 and 268. The content of each document may be scanned by an analysis engine to identify relevance according to the content of the document. The content searched may be based on existing content of a collaboration. For example, if an active collaboration over a period of 48 hours includes content, such as topics 'A1', 'A2' . . . 'AN', then those topics may be used as the basis for a query or monitoring procedure where designated folders of a client device are searched for additional content related to the existing content of the active collaboration. If a match occurs, the match may be scored for relevancy which may include an incremental score that increases each instance a relevant match occurs. The matching may be based on keywords, natural language processing, statistical similarity comparison techniques, etc.

The content of the collaboration may be scanned periodically to identify words and related subject matter and then that identified information can be compared to information in each of the collaboration participants' devices, such as the shared folders and shared portions of their devices which are linked to the ongoing collaboration session. As a result, when a threshold score of relevance is identified or other types of matching criteria are performed, the document(s), files, links, etc., such as 'A3', which are identified as relevant, may be automatically copied and shared with the active collaboration virtual workspace. This may include copying and pasting, creating a virtual icon or other indicia based on what is identified in the workplaces/desktops of a particular client device and placing that content in the collaboration session. Another folder, such as 'XYZ' 272 of client device 112 may be scanned and analyzed to identify documents 274, 276 and a databank link 282 to various remotely stored content. The content in the databank may score as being relevant to the collaboration and may be automatically copied and shared with the virtual workspace.

The information identified may cause a specific icon(s) to be created and shared, such as content 152. This process may occur for all the client devices identified as active participants with the ongoing conference. Once a collaboration session is launched, the information can be shared periodically by automated search and retrieval operations. Every time an email is archived, a document is saved, a link is created, etc., that information can be identified by the conference collaboration application on the individual devices of all participants. The information can then be shared with everyone assuming that information is relevant to the discussion topics and is in a shared portion of the client devices.

Figure 6:
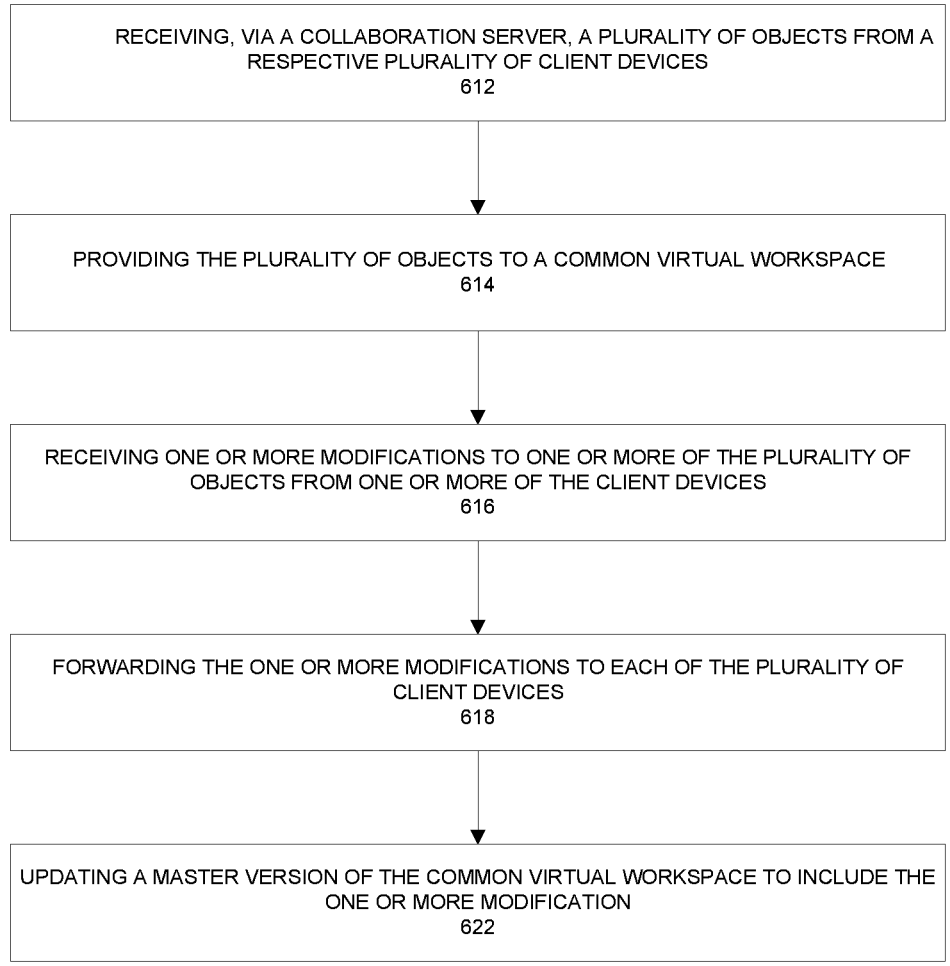
FIG. 6 illustrates a flow diagram of process for sharing content in a collaboration session according to example embodiments.

FIG. 6 illustrates a flow diagram of a process for sharing content in a collaboration session according to example embodiments. Referring to FIG. 6, the process includes receiving, via a collaboration server, a plurality of objects from a respective plurality of client devices 610, providing the plurality of objects to a common virtual workspace 612, receiving one or more modifications to one or more of the plurality of objects from one or more of the client devices 614, forwarding the one or more modifications to each of the plurality of client devices 616, and updating a master version of the common virtual workspace to include the one or more modifications 618.

The one or more modifications to the one or more of the plurality of objects may include one or more of adding new objects and changing to the one or more of the plurality of objects. As the new objects are modified, discovered by auditing performed by the application or via other identification operations, the changes will be updated in the common virtual workspace, such as a single graphical user interface that is shared with various the client devices and their respective profiles maintained by the application server. The process may also include linking folders associated with the client devices when the client devices forwards one or more of the plurality of objects to the collaboration server. This may be performed one client device at a time. The profiles of the client devices may identify certain folders on the client devices where the updated information can be discovered by a periodic audit. The process may also include periodically searching for new links to data files and databanks stored in a client device profile associated with the client device, and adding the new links, files, folder, etc., to the virtual workspace as new objects or as updated versions of the previous objects. The periodic searching is performed on a shared portion of each client device or via locations identified by the client devices in their respective profiles. For example, the application may perform periodic searching of the shared portions of the plurality of client device profiles associated with the plurality of client devices, identifying new data files, and adding the new data fails to the virtual workspace as new objects. The new objects may be added to designated portions of the common virtual workspace assigned to each of the plurality of client devices. The objects created are shared to portions of the workspace associated with the client devices and profiles where the content for the objects was identified. For example, files identified on one client device will be shared as objects in a portion of the workspace assigned to the client device where the content associated with the objects was discovered.

The one or more modifications to the one or more of the plurality of objects comprises one or more of adding new objects and changing to the one or more of the plurality of objects. The process may also include linking a folder associated with a client device when the client device forwards one or more of the plurality of objects to the collaboration server. The process may further include periodically searching for new links to data files and databanks stored in a client device profile associated with the client device, and adding the new links to the virtual workspace as an object. The master version of the common virtual workspace will be updated on the collaboration server to include the one or more modifications. Once the master version is updated, the individual versions displayed on each client device will be updated in a periodic update performed by the collaboration server.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 7:
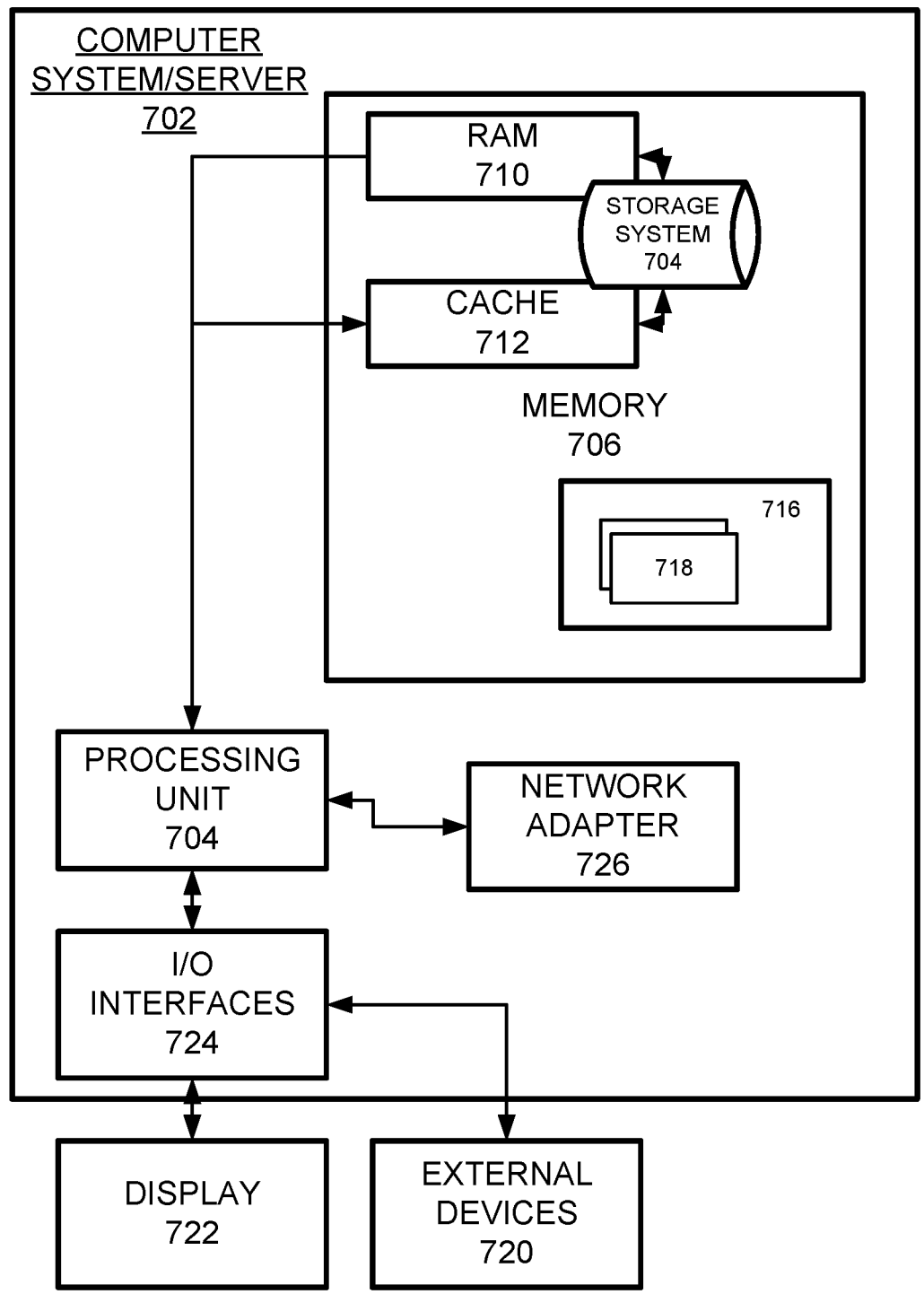
FIG. 7 illustrates a system configuration for storing and executing instructions for any of the example processes according to example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 7, computer system/server 702 in cloud computing node 700 is displayed in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server

702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not displayed, other hardware and/or software components could be used in conjunction with computer system/server 702. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
receiving, via a collaboration server, a plurality of objects from a respective plurality of client devices;
providing the plurality of objects to a common virtual workspace;
receiving one or more modifications to one or more of the plurality of objects from one or more of the plurality of client devices;
forwarding the one or more modifications to each of the plurality of client devices;
updating a master version of the common virtual workspace to include the one or more modifications as intentionally shared content from the one or more client devices;
monitoring one or more unintentionally shared additional objects associated with one or more of the plurality of client devices and locating unintentionally shared content associated with the unintentionally shared additional objects in one or more designated folders of each of the plurality of client devices;
identifying a match between the content of the one or more unintentionally shared additional objects and one or more of the plurality of objects and scoring the match based on a relevancy of the match, wherein the relevancy of the match is based on at least one of keywords, natural language processing, and statistical similarity comparison techniques; and
upon the relevancy of the match exceeding a threshold, forwarding the matched content to the common virtual workspace.

2. The method of claim 1, comprising periodically searching for new links to data files and databanks stored in a client device profile associated with the client device; and adding the new links to the virtual workspace as new objects.

3. The method of claim 2, wherein the periodic searching is performed on a shared portion of the client device.

4. The method of claim 1, wherein the one or more modifications to the one or more of the plurality of objects comprises one or more of adding new objects and changing to the one or more of the plurality of objects.

5. The method of claim 1, comprising linking a folder associated with a client device when the client device forwards one or more of the plurality of objects to the collaboration server.

6. The method of claim 1, comprising periodically searching shared portions of a plurality of client device profiles associated with the plurality of client devices; identifying new data files; and adding the new data fails to the virtual workspace as new objects.

7. The method of claim 1, wherein the new objects are added to designated portions of the common virtual workspace assigned to each of the plurality of client devices.

8. An apparatus comprising:
at least one or more processors;
a memory coupled to the one or more processors and storing instructions that when executed by the one or more processors performs the steps to:
receive a plurality of objects from a respective plurality of client devices;
provide the plurality of objects to a common virtual workspace;
receive one or more modifications to one or more of the plurality of objects from one or more of the plurality of client devices;
forward the one or more modifications to each of the plurality of client devices;
update a master version of the common virtual workspace to include the one or more modifications as intentionally shared content from the one or more client devices;
monitor one or more unintentionally shared additional objects associated with one or more of the plurality of client devices and locate unintentionally shared content associated with the unintentionally shared additional objects in one or more designated folders of each of the plurality of client devices;
identify a match between content of the one or more unintentionally shared additional objects and one or more of the plurality of objects and scoring the match based on a relevancy of the match, wherein the relevancy of the match is based on at least one of keywords, natural language processing, and statistical similarity comparison techniques; and
upon the relevancy of the match exceeding a threshold, forward the matched content to the common virtual workspace.

9. The apparatus of claim 8, wherein the processor is further configured to periodically search for new links to data files and databanks stored in a client device profile associated with the client device, and add the new links to the virtual workspace as new objects.

10. The apparatus of claim 9, wherein the periodic search is performed on a shared portion of the client device.

11. The apparatus of claim 8, wherein the one or more modifications to the one or more of the plurality of objects comprises one or more of adding new objects and changing to the one or more of the plurality of objects.

12. The apparatus of claim 8, wherein the processor is further configured to link a folder associated with a client device when the client device forwards one or more of the plurality of objects to the collaboration server.

13. The apparatus of claim 8, wherein the processor is further configured to
periodically search shared portions of a plurality of client device profiles associated with the plurality of client devices,
identify new data files; and
add the new data fails to the virtual workspace as new objects.

14. The apparatus of claim 8, wherein the new objects are added to designated portions of the common virtual workspace assigned to each of the plurality of client devices.

15. A non-transitory computer readable storage medium configured to store instructions that when executed cause a processor to perform:
receiving, via a collaboration server, a plurality of objects from a respective plurality of client devices;
providing the plurality of objects to a common virtual workspace;
receiving one or more modifications to one or more of the plurality of objects from one or more of the plurality of client devices;
forwarding the one or more modifications to each of the plurality of client devices;
updating a master version of the common virtual workspace to include the one or more modifications as intentionally shared content from the one or more client devices;

monitoring one or more unintentionally shared additional objects associated with one or more of the plurality of client devices and locating unintentionally shared content associated with the unintentionally shared additional objects in one or more designated folders of each of the plurality of client devices;

identifying a match between the content of the one or more unintentionally shared additional objects and one or more of the plurality of objects and scoring the match based on a relevancy of the match, wherein the relevancy of the match is based on at least one of keywords, natural language processing, and statistical similarity comparison techniques; and upon the relevancy of the match exceeding a threshold, forwarding the matched content to the common virtual workspace.

16. The non-transitory computer readable storage medium of claim 15, wherein the processor is further configured to perform: periodically searching for new links to data files and databanks stored in a client device profile associated with the client device; and adding the new links to the virtual workspace as new objects.

17. The non-transitory computer readable storage medium of claim 16, wherein the periodic searching is performed on a shared portion of the client device.

18. The non-transitory computer readable storage medium of claim 15, wherein the one or more modifications to the one or more of the plurality of objects comprises one or more of adding new objects and changing to the one or more of the plurality of objects.

19. The non-transitory computer readable storage medium of claim 15, wherein the processor is further configured to perform:
    linking a folder associated with a client device when the client device forwards one or more of the plurality of objects to the collaboration server.

20. The non-transitory computer readable storage medium of claim 15, wherein the processor is further configured to perform:
    periodically searching shared portions of a plurality of client device profiles associated with the plurality of client devices;
    identifying new data files; and
    adding the new data fails to the virtual workspace as new objects.

* * * * *